United States Patent
Hackett

(10) Patent No.: US 11,807,283 B2
(45) Date of Patent: Nov. 7, 2023

(54) EMERGENCY ARREST DEVICE FOR ZIP-LINING

(71) Applicant: Donald Andrew Hackett, Hendersonville, TN (US)

(72) Inventor: Donald Andrew Hackett, Hendersonville, TN (US)

(*) Notice: Subject to any disclaimer, the term of this patent is extended or adjusted under 35 U.S.C. 154(b) by 242 days.

(21) Appl. No.: 17/193,110

(22) Filed: Mar. 5, 2021

(65) Prior Publication Data
US 2022/0281493 A1 Sep. 8, 2022

(51) Int. Cl.
*B61H 9/02* (2006.01)
*F16D 63/00* (2006.01)

(52) U.S. Cl.
CPC ............. *B61H 9/02* (2013.01); *F16D 63/008* (2013.01)

(58) Field of Classification Search
CPC .............................. B61H 9/02; F16D 63/008
See application file for complete search history.

(56) References Cited

U.S. PATENT DOCUMENTS

| | | |
|---|---|---|
| 5,931,100 A | 8/1999 | Sutton et al. |
| 6,666,773 B1 * | 12/2003 | Richardson ........... F16D 63/008 104/204 |
| 7,966,941 B1 | 6/2011 | Brannan |
| 9,004,235 B2 | 4/2015 | Headings |
| 9,021,962 B2 | 5/2015 | Hackett |
| 10,730,535 B2 | 8/2020 | Hackett |
| 2006/0027134 A1 | 2/2006 | Steele et al. |
| 2007/0039788 A1 | 2/2007 | Fulton |
| 2007/0215569 A1 | 9/2007 | Chepurny et al. |
| 2009/0255436 A1 | 10/2009 | Buckman |
| 2009/0266267 A1 | 10/2009 | Moss |
| 2010/0243374 A1 | 9/2010 | Boren et al. |
| 2011/0162917 A1 | 7/2011 | Steele et al. |
| 2012/0145498 A1 | 6/2012 | Liston et al. |
| 2012/0160122 A1 | 6/2012 | Lerner et al. |

(Continued)

FOREIGN PATENT DOCUMENTS

KR 101446650 B1 10/2014

OTHER PUBLICATIONS

International Search Report issued in International Application No. PCT/US2022/018929, dated Aug. 30, 2022.

(Continued)

*Primary Examiner* — Melody M Burch
(74) *Attorney, Agent, or Firm* — United IP Counselors, LLC

(57) ABSTRACT

An emergency arrest device for a zip line is disclosed. The device uses a rope wound around the zip line, e.g., in a double helix, as the "core reactor" that provides stopping force. The device receives the ends of the wound rope and controls the position of the rope and tension within the rope to create and modulate the stopping force. Specifically, the device may comprise a front plate, a rear plate assembly, connecting members connecting the front plate and the rear plate assembly, and a movable carriage. The rear plate assembly includes a first receiving structure adapted to receive and secure one end of the rope. The moveable carriage is mounted within the emergency arrest device between the front plate and the rear plate assembly and carries a second receiving structure adapted to receive and secure the other end of the rope.

17 Claims, 6 Drawing Sheets

(56) References Cited

U.S. PATENT DOCUMENTS

| | | | |
|---|---|---|---|
| 2014/0158012 A1* | 6/2014 | Hackett | B61H 9/02 |
| | | | 188/65.1 |
| 2014/0326161 A1 | 11/2014 | Halliday et al. | |
| 2016/0272225 A1* | 9/2016 | Liggett | B61B 3/00 |
| 2018/0214782 A1 | 8/2018 | Hackett | |
| 2018/0231075 A1* | 8/2018 | Mahana | F16D 65/028 |
| 2019/0232984 A1 | 8/2019 | Hackett | |

OTHER PUBLICATIONS

Written Opinion issued in International Application No. PCT/US2022/018929, dated Aug. 30, 2022.

* cited by examiner

EMERGENCY ARREST DEVICE FOR ZIP-LINING

TECHNICAL FIELD

The invention relates to emergency arrest devices for zip lining.

BACKGROUND

Both a recreational activity and a mode of transportation, zip lining involves moving across a zip line, a wire or cable that is suspended between two points at different elevations, usually at least a few meters off the ground. In a typical arrangement, a wheeled trolley is mounted on the zip line. The passenger wears a harness that is suspended from the trolley using a tether. The trolley moves across the zip line unpowered under the influence of gravity.

The speed of a rider along a zip line depends on several factors, including the slope of the zip line, the weight of the rider, friction between the trolley and the line, and wind speed and direction. In order to reach the other end of the line, a rider must accumulate enough speed to reach the other side. If the trolley is too slow (e.g., because the zip line is not inclined steeply enough) friction and other factors may cause the trolley to stop moving in the middle of the line, leaving the rider stranded and requiring course personnel to go out onto the line and haul the trolley in, a difficult process made more difficult and dangerous by the height.

While lack of sufficient speed is a problem, too much speed is also a problem. Simply put, zip line riders need some mechanism to stop. In some cases, zip liners are simply issued thick leather gloves, and are expected to slow down by grabbing or brushing against the zip line above them. Dislocated shoulders can result from this maneuver.

As zip lining has become more popular, safety protocols and devices have improved. Most courses now require a braking system that can stop the trolley, as well as an emergency arrest device that can bring the trolley to a stop if the primary braking system fails. As examples, U.S. Pat. No. 9,021,962 discloses a primary braking system, and U.S. Pat. No. 10,730,535 discloses an emergency arrest device that serves as a backup to the primary brake. Both are the work of the present inventor.

U.S. Pat. No. 10,730,535 uses a Prusik knot tied on the zip line as the core arresting element. The device of this patent controls the knot to provide emergency braking. While this device has proven effective in most conditions, the Prusik knot has some inherent limitations.

BRIEF SUMMARY

One aspect of the invention relates to an emergency arrest device. The emergency arrest device uses a rope wound around the zip line, e.g., in a double helix, as the "core reactor" that provides stopping force. The emergency arrest device receives the ends of the wound rope and controls the position of the rope to create and modulate the stopping force. Specifically, the device may comprise a front plate, a rear plate assembly, connecting members connecting the front plate and the rear plate assembly, and a movable carriage. The rear plate assembly includes a first receiving structure adapted to receive and secure one end of the rope. The moveable carriage is mounted within the emergency arrest device between the front plate and the rear plate assembly and carries a second receiving structure adapted to receive and secure the other end of the rope. The first and second receiving structures may be openings through which the rope is threaded or laced after being wound around the zip line.

The emergency arrest device may include a simple mechanism for controlling the initial tension in the rope. Specifically, the rear plate assembly may include a first plate installed so as to face the front plate, a second plate that carries the first receiving structure, and a third plate. The third plate has a shape adapted to receive the second plate, and the second and third plates are keyed or shaped such that the second plate can be received in the third plate in any of a number of rotational positions. The second and third plates are installed behind the first plate. With this mechanism, an operator can pull the second plate out, twist it, and re-seat it in the third plate to alter the initial tension in the rope. The second plate may carry permanent magnets that are positioned and arranged to be attracted to the first plate.

In addition to these features, the emergency arrest device may include a resilient member adapted to bear between the front plate and the moveable carriage.

Other aspects, features, and advantages of the invention will be set forth in the description that follows.

BRIEF DESCRIPTION OF THE DRAWING FIGURES

The invention will be described with respect to the following drawing figures, in which like numerals represent like elements throughout the figures, and in which.

and

Figure 4:
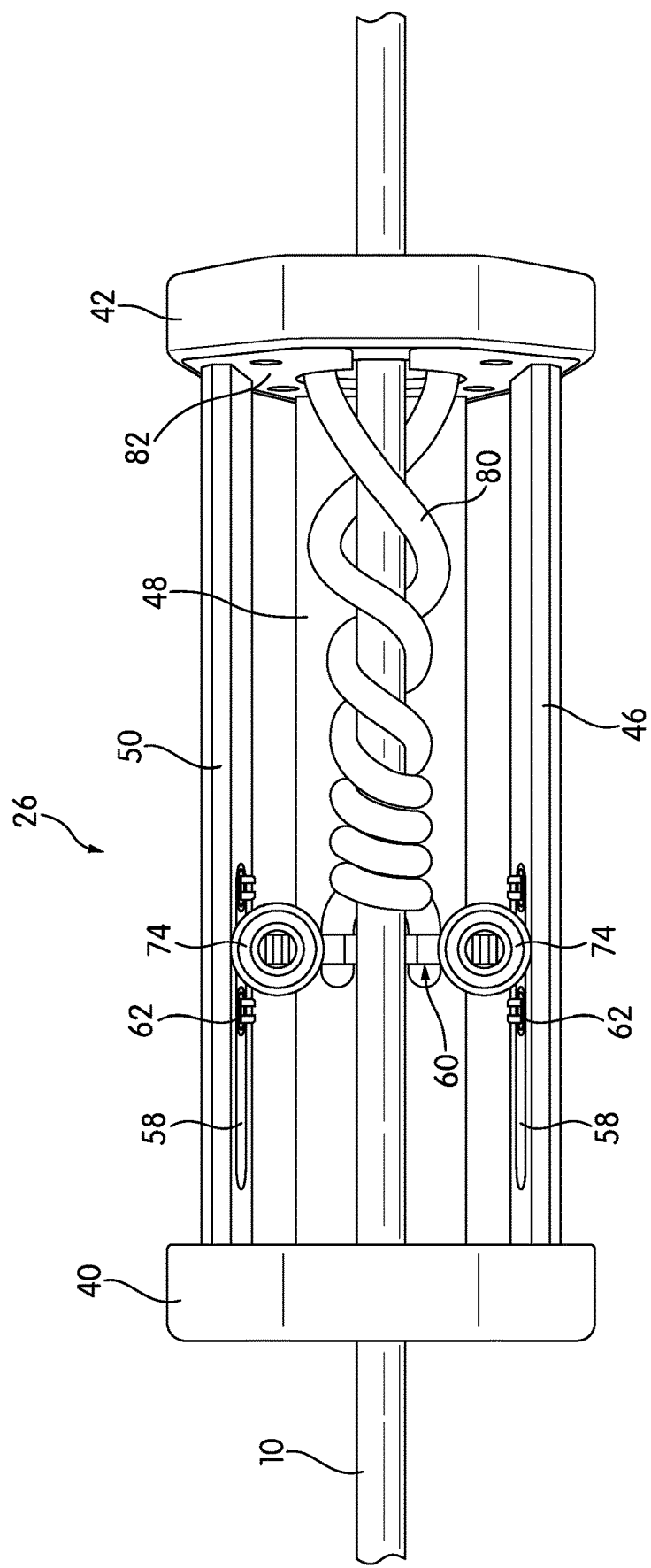

FIG. 4 is a top plan view of the emergency arrest device; and

Figure 5:
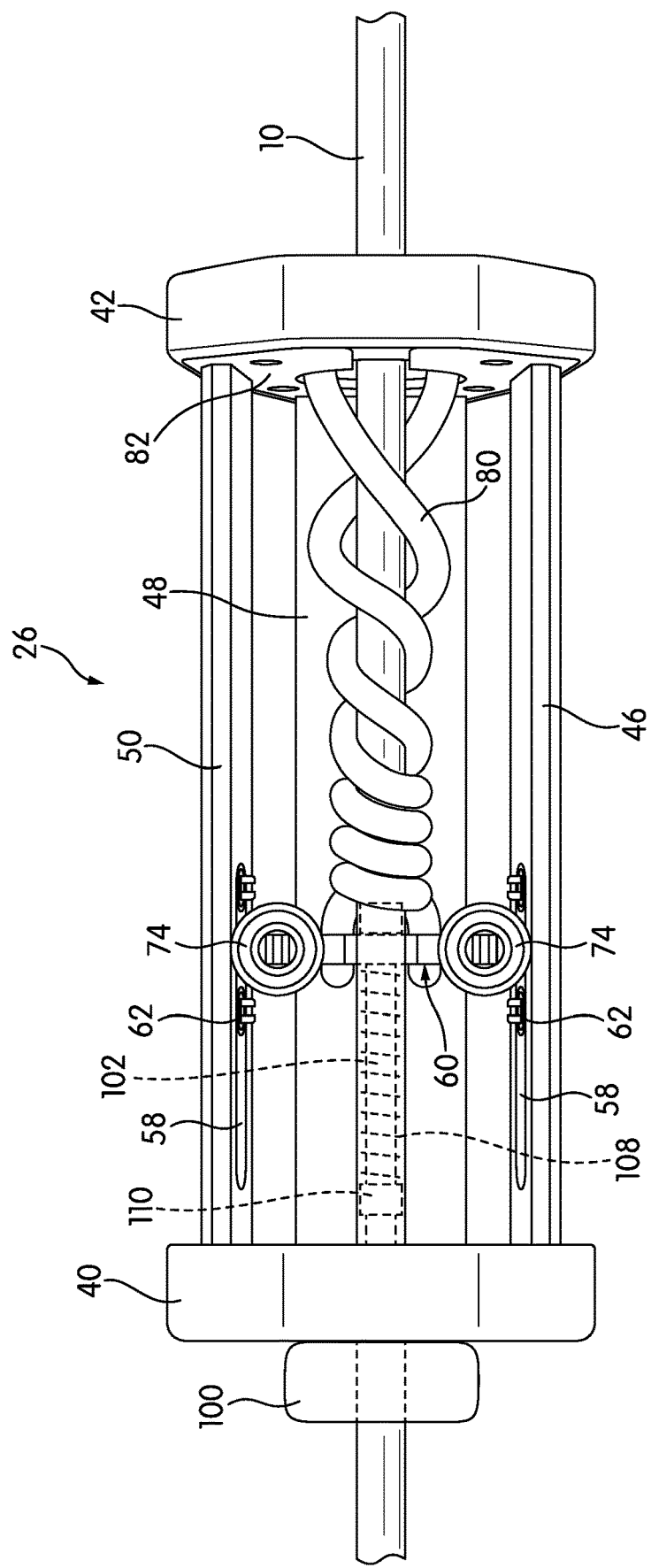
Figure 6:
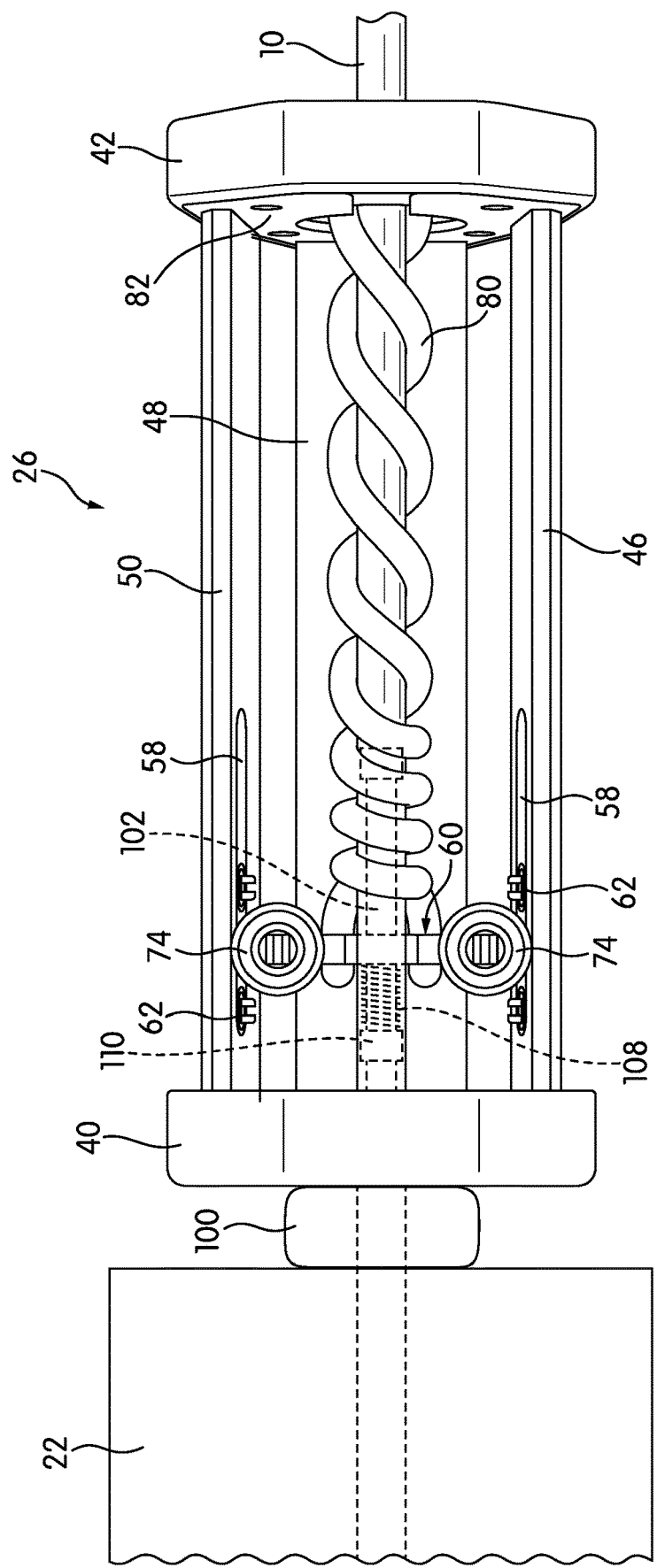

FIGS. 5-6 are top plan views of the emergency arrest device similar to the view of FIG. 4, illustrating a movement sequence that occurs when the device is impacted, allowing the device to arrest a rider.

DETAILED DESCRIPTION

Figure 1:
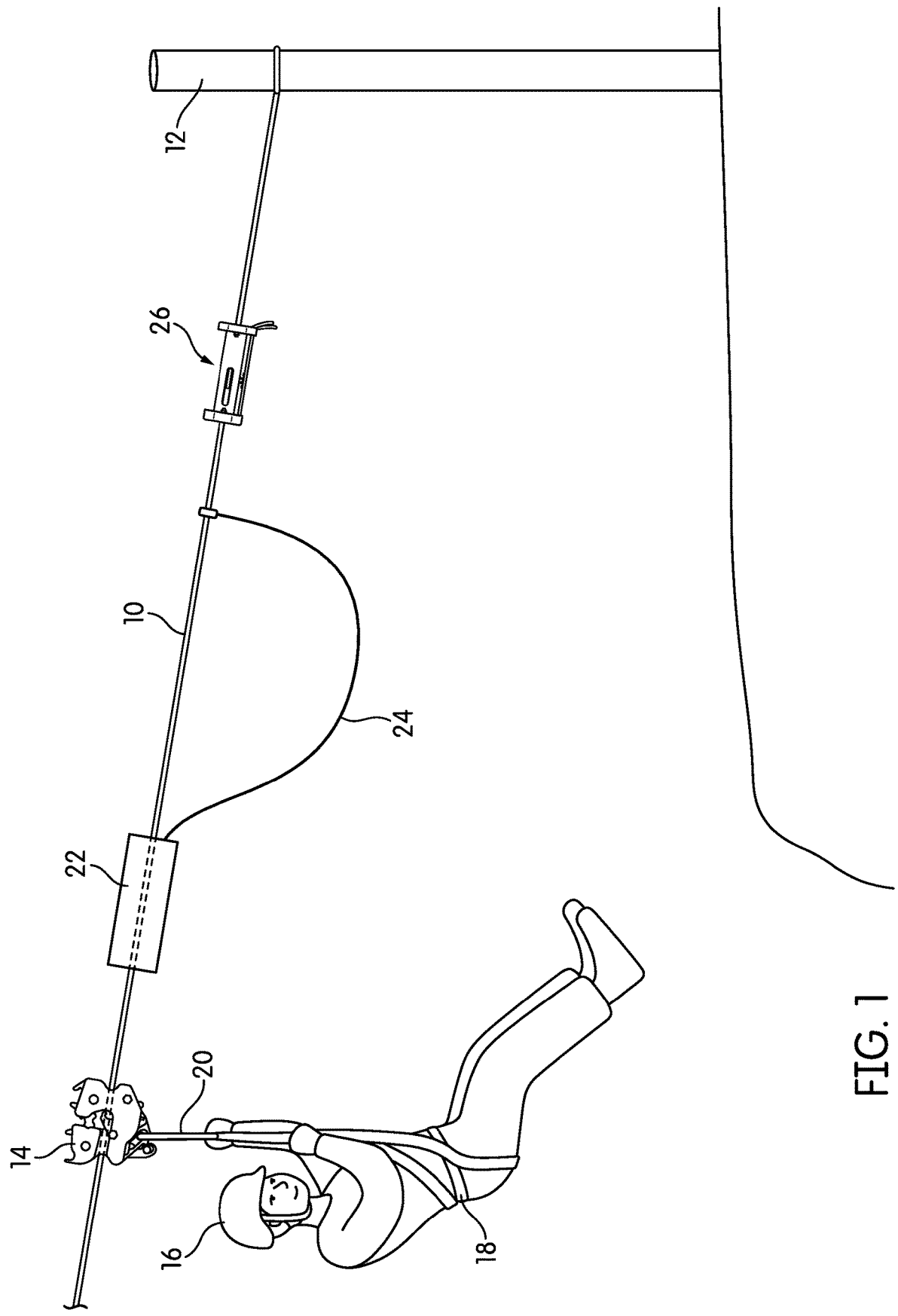
FIG. 1 is a perspective view illustrating one end of a zip line with a primary braking system and an emergency arrest device according to one embodiment of the invention.

FIG. 1 is a perspective view of one end of a zip line 10. As shown, the zip line 10 is fixed at one end to an object 12, such as a pole or tree. A trolley 14 rides on the zip line 10. The trolley 14 of FIG. 1 is the trolley disclosed in U.S. Patent Application Publication No. 2018/0214782, the contents of which are incorporated by reference in their entirety, although it may be of any type. A rider 16 is suspended from the trolley 14 using a harness 18 and tether 20.

As shown in FIG. 1, the trolley 14 is set to impact a primary brake 22. The primary brake 22 in some embodiments may connect to or capture the trolley 14 as it slows the movement of the trolley 14. The primary brake 22 is connected to a rope line 24 that allows it to be hauled in toward the end of the zip line 10 if needed. The primary brake 22 may be of any type, but portions of this description may assume that it is the brake of U.S. Pat. No. 9,021,962, the contents of which are incorporated by reference in their entirety. Positioned behind the primary brake 22 is an emergency arrest device 26.

Figure 2:
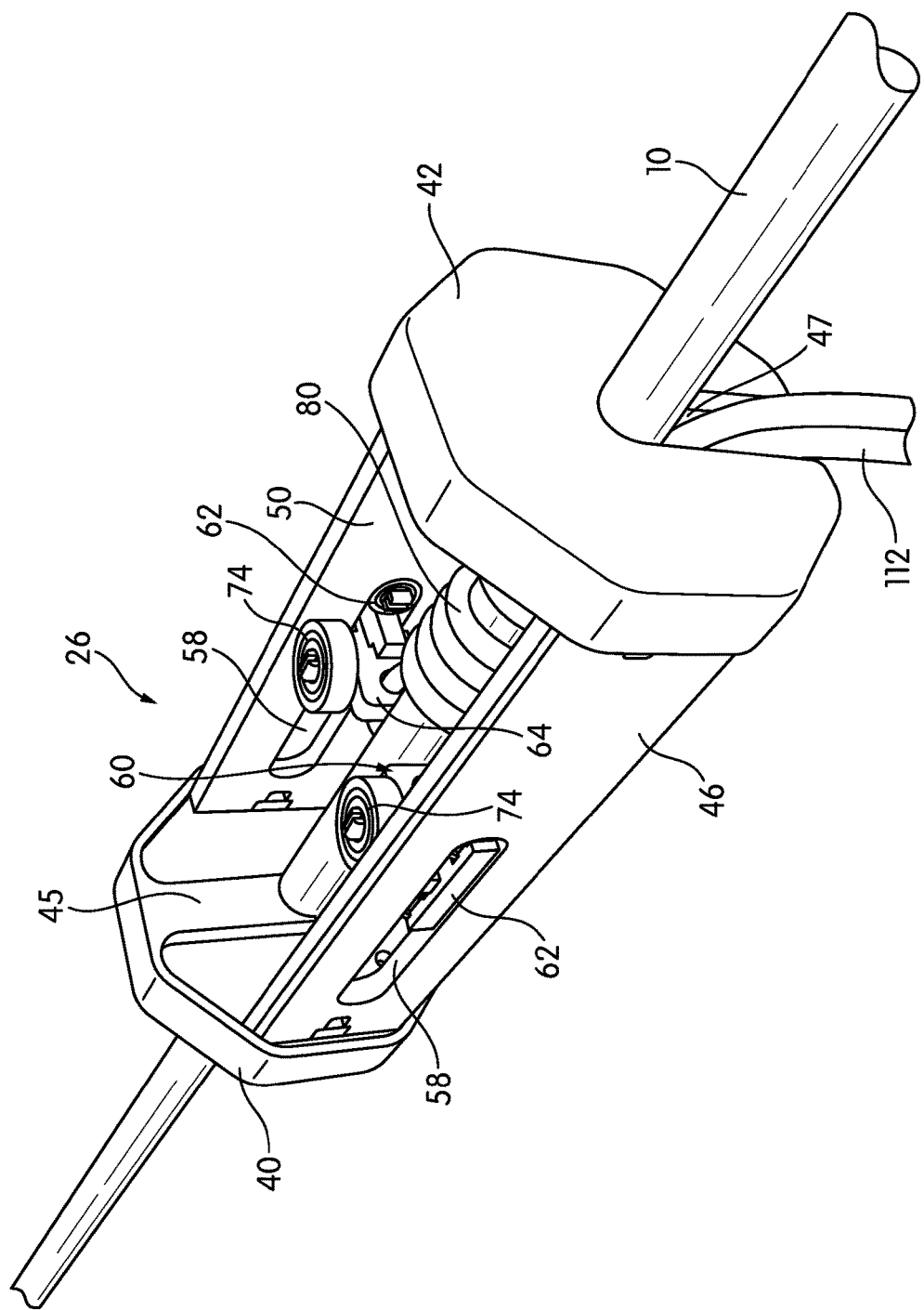
FIG. 2 is a perspective view of the emergency arrest device of FIG. 1.
Figure 3:
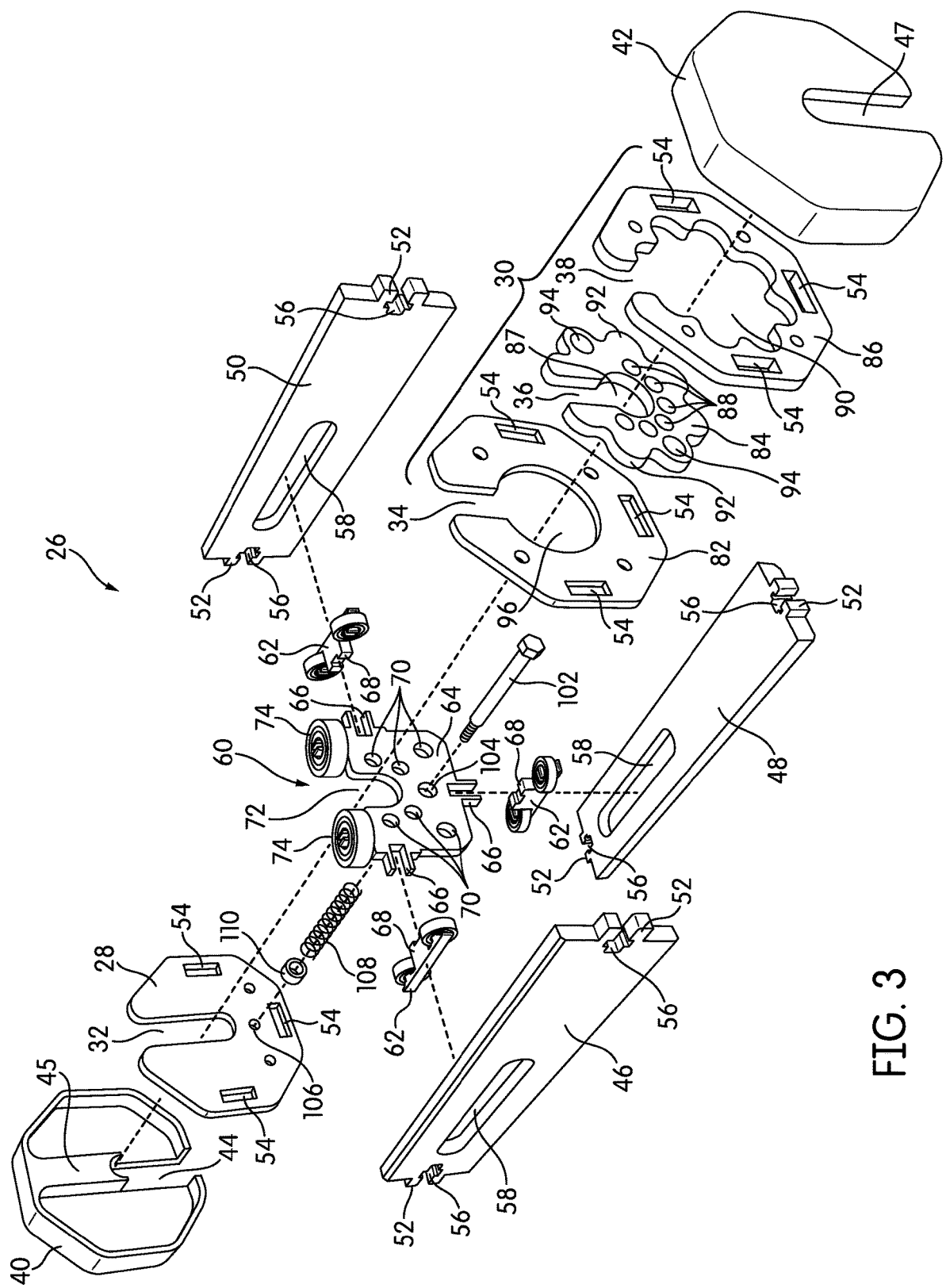
FIG. 3 is an exploded perspective view of the emergency arrest device.

FIG. 2 is a perspective view of the emergency arrest device 26, shown as installed on the zip line 10, and FIG. 3 is an exploded perspective view of the emergency arrest device 26. The device 26 has an open body with a front plate 28 and a rear plate assembly 30. The front plate 28 has a vertical U-shaped slot 32 that opens at a top edge of the front plate 28 and extends down to the center of the front plate 28. Each component of the rear plate assembly 30 has a similar slot 34, 36, 38. These openings allow the emergency arrest device 26 to be seated on the zip line 10 as shown in FIG. 2. Front and rear bumper-caps 40, 42 have complementary slots 44, 47 extending in the opposite direction: from the bottoms of the bumper-caps 40, 42 to their centers. To seat the device 26 on the zip line 10, the zip line 10 is inserted into the aligned slots 32, 34, 36, 38 in the front plate 28 and the rear plate assembly 30, and then the bumper-caps 40, 42 are placed over the front plate 28 and the rear plate assembly 30, securing the device 26 on the zip line 10. As shown particularly with respect to the front bumper-cap in FIG. 3, each bumper-cap 40, 42 has inwardly- and downwardly-extending ridge structure 45 that helps to fill its corresponding slot 32 and cabins the zip line 10 to move within an opening just slightly larger than the zip line 10 itself.

Three bars 46, 48, 50 extend between the front plate 28 and the rear plate assembly 30, two of the bars 46, 50 opposite one another and forming sidewalls of the device 26, and the third bar 48 serving as a bottom. Each bar 46, 48, 50 has a tongue 52 at each end that inserts into corresponding sets of openings 54 in the front plate 28 and the rear plate assembly 30.

At the base of the tongue 52, each bar 46, 48, 50 carries a transverse slot 56. In the illustrated embodiment, the transverse slot 56 is rectangular in overall shape and is sized and otherwise adapted to hold a nut. Bolts inserted through the slots 54 in the front plate 28 and rear plate assembly 30 into nuts held within the transverse slots 56 hold the emergency arrest device 26 together.

Each of the bars 46, 48, 50 has a longitudinal slot 58. The longitudinal slot 58 of each bar 46, 48, 50 is in the same position and has the same length, extending over about half the length of each bar 46, 48, 50. A carriage 60 is movably mounted within the emergency arrest device 26 and has three wheeled bearings 62, one for each bar 46, 48, 50, that bear movably within the longitudinal slots 58. The slots 58 are but one example of guide structure for the carriage 60 that may be used. In other embodiments, wheeled bearings may bear on the bars 46, 48, 50, e.g., within shallow grooves.

The carriage 60 itself comprises a main plate 64 to which the wheeled bearings 62 attach through forked engaging structures 66 on the sides and bottom. Each of the wheeled bearings 62 has a complementary forked engaging structure 68. Of course, any sort of engaging structures may be used in other embodiments. The main plate 64 of the carriage 60 is perforated with a number of holes 70 of equal size whose purpose will be described in greater detail below. The carriage 60 also includes a U-shaped slot 72 that begins at the top edge of the main plate 64 and extends downwardly. When the emergency arrest device 26 is assembled, the U-shaped slot 72 aligns with the other slots 32, 34, 36, 38 to allow the zip line 10 to pass. A wheel 74 is arranged on each side of the slot 72 with its axis of rotation oriented vertically. The wheels 74 are thus adapted to bear against the two side plates 46, 50.

As can be seen in FIG. 2 and in the top perspective view of FIG. 4, the central element of the emergency arrest device 26, the core reactor that provides the stopping force, is a rope 80 coiled around the zip line 10 in a double helix. As coiled in the position shown in FIG. 4, the rope 80 bears against and grips the zip line 10, creating the frictional force necessary to allow the emergency arrest device 26 to stop the movement of an impacting trolley 14 or trolley/primary brake combination.

As can best be seen in FIG. 4, the rope 80 is laced through the openings 70 in the main plate 64 of the carriage 60, which fixes it at one end of the emergency arrest device 26. The rope 80 would then be wound around the zip line 10 in a double helix and secured at the other end of the emergency arrest device 26. The point of securement at the rear end of the emergency arrest device 26 may be a rotationally fixed plate with a set of openings, like the main plate 64 of the carriage 60.

If the rope 80 is fixed at both front and rear ends of the emergency arrest device 26, the main way of adjusting the initial tension in the rope 80, and thus, its stopping power, is to unlace the rope 80, tighten its coils, and secure it once again. This is an effective but cumbersome process. Therefore, the emergency arrest device 26 of the illustrated embodiment has a feature that allows the initial tension in the rope 80 to be adjusted without unlacing and re-wrapping the rope 80 around the zip line 10. Specifically, the rear plate assembly 30 has three main components: a first plate 82, a second plate 84, and a third plate 86.

The second plate 84 has a slot 36 extending from its upper edge, as described above. Toward the center of the second plate 84, the slot 36 broadens into an central opening 87 that is just larger than the zip line 10 itself. Arrayed around the opening 87 in a half-moon or semi-circle are a plurality of holes 88 that are equal in size to the holes 70 in the front plate 28. The second end of the rope 80 is laced into the holes 88.

The third plate 86 has a central opening 90 with a shape complementary to that of the second plate 84. Both the second plate 84 and the third plate 86 are multiply-keyed or otherwise provided with features such that the second plate 84 can be placed within the third plate 86 in any one of a number of positions. In this particular case, the second plate 84 has six rounded lobes 92 allowing it to be set in different rotational positions in the third plate 86, which has corresponding shapes. A pair of permanent magnets 94, such as neodymium magnets, are inlaid in the second plate 84 and provide some of the attractive force necessary to maintain the second plate 84 in its position.

With this arrangement, the rope 80 is laced into the second plate 84. If the operator desires to change the initial tension in the rope 80, the second plate 84 can be removed from the third plate 86, rotated to twist the rope more tightly around the zip line 10 (or, alternatively, rotated in the other direction to untwist the rope), and replaced. The first plate 82 is secured to the second/third plate assembly 84, 86 facing the front plate 28. The first plate 82 has a central opening 96 large enough to allow the rope 80 to pass, but small enough that the first plate 82 forms an inwardly-extending lip relative to the second plate 84. (As can be seen in FIG. 3, the central opening 96 of the first plate 82 is smaller than the central opening 90 of the third plate 86.)

In this embodiment, the second plate 84 and the third plate 86 are made of a non-ferromagnetic material, such as aluminum. However, the first plate 82 of this embodiment is made of steel. Thus, the permanent magnets 94 are attracted to the radial lip of the first plate 82 that extends farther inward than the opening 90 of the third plate 86.

In this embodiment, lacing the rope 80 into the second plate 84 and into the carriage 60 is a convenient way of connecting the rope 80 to and between these structures. It has the advantage of having fewer possible failure points.

However, laced connections may take more time to unwind and undo. In other embodiments, it would be possible to use clamps or to install crimps or collars on the ends of the rope 80 to secure it to and between the second plate 84 and the carriage 60.

FIG. 5 is a top perspective view similar to the view of FIG. 4 illustrating the movement of the emergency arrest device 26 when it is impacted. As FIG. 5 illustrates, an external bumper 100 may be placed in front of the front bumper-cap 42 to absorb impact forces. The initial position of the emergency arrest device 26 is essentially the same as the position shown in FIG. 4: the carriage 60 is at the rearward end of the slots 58.

FIG. 6 is a similar top perspective view illustrating the position of the emergency arrest device 26 and its elements when impacted by the primary brake 22. The emergency arrest device 26 is pushed rearwardly. As the body of the emergency arrest device 26 moves rearwardly, the carriage 60 slides within the slots 58 to the position shown in FIG. 6. Since the rope 80 is fixed at the rear plate assembly 30, the coils of rope 80 are pulled rearwardly by the rear plate assembly 30 and cinch against the zip line 10.

Because the carriage 60 moves freely, guided by the slots 58, there is a possibility that relative movement of the body of the emergency arrest device 26 and the carriage 60 may cause the rope 80 to cinch prematurely or when that is not desired. If the rope 80 cinches too fast, it could potentially cause the assembly to stop very short, raising the potential for an unpleasantly fast deceleration. Thus, the emergency arrest device 26 also carries a mechanism that moderates the tendency of the carriage 60 to move and the rope 80 to cinch.

Specifically, as shown in FIG. 3, a bolt 102 extends between the moveable carriage 60 and the front plate 28, extending through a lower central opening 104 in the carriage 60 and to a corresponding lower central opening 106 in the front plate 28. In the illustrated embodiment, the bolt 102 is a cap-head shoulder bolt, meaning that it includes an unthreaded length of greater diameter and a threaded length of reduced diameter. The opening 104 is sized for the greater-dimension shoulder portion of the bolt 102 such that the carriage 60 moves freely over the shoulder portion of the bolt 102. The opening 106, on the other hand, is sized for the lesser-diameter threaded portion of the bolt 102. The opening 106 may itself be threaded, or it may allow the threaded portion of the bolt 102 to pass and use a nut on the opposite side to secure the bolt 102.

A compression spring 108 is installed concentrically over the shoulder portion of the bolt 102. The arrangement is such that one end of the compression spring 108 bears against the carriage 60. The other end of the compression spring 108 bears against a collar 110 installed on the bolt 102. The collar 110 is secured in place by a set screw (not shown in FIG. 3) such that its position along the shoulder of the bolt 102 is adjustable. By adjusting the position of the collar 110 along the bolt 102, one can adjust the initial length of the compression spring 108, and thus, the level of resilient force that it provides. The resilient force provided by the compression spring 108 influences the level of force required to cause the carriage 60 to move enough to make the rope 80 cinch, and prevents the rope 80 from cinching prematurely. This, in turn, makes it easier to position the emergency arrest device 26 along the zip line 10 without that movement causing the rope 80 to cinch. The position of the compression spring 108 as the carriage 60 moves is shown in phantom in FIGS. 5 and 6.

As those of skill in the art will realize, this force-moderating set of features is optional. There may be embodiments in which immediate cinching of the rope 80 with any level of impact force is a desirable feature. Where such features are included, the resilient member may vary from embodiment to embodiment. A compression spring is only one type of resilient member, and force moderation may be achieved in similar fashion with other types of resilient members including, e.g., torsional springs.

Of course, the stopping characteristics of the emergency arrest device 26 also depend in some part on the characteristics of the rope 80 itself. The rope 80 may be made of any conventional material, such as hemp or nylon. For example, 8 mm nylon static line, of the same sort usually used to make Prusik knots in climbing applications, may be used. The rope will typically be stranded/braided, but may also be of the core/sheath type.

As can be seen particularly in FIG. 2, the free ends 112 of the rope 80 pass out of the rearward end of the emergency arrest device 26. The free ends 112 may simply be left to hang in some cases, while in other cases, they may be tied or fused together.

The emergency arrest device 26 thus has the advantage of using a familiar and readily available element—rope—as the core reactor that provides stopping force against the zip line 10. This means that the emergency arrest device 26 can brake elements traveling along the zip line 10 without causing undue wear on the zip line 10 itself. The rope 80 itself can be easily replaced should it wear out, and the tautness of the rope 80 against the zip line can be relatively easily adjusted using the mechanism of the rear plate assembly 30 without having to re-lace the rope into the emergency arrest device 26. Overall, the emergency arrest device 26 may be better tailored for its application, and provide more stopping power under adverse conditions, than a Prusik knot or a device based on a Prusik knot.

Although the description above largely focuses on the emergency arrest device 26 itself, aspects of the invention also pertain to methods of using such devices, and in particular, methods of using a rope wound around the zip line 10 as the core reactor for arresting a trolley or trolley-brake combination.

While the invention has been described with respect to certain embodiments, the description is intended to be exemplary, rather than limiting. Modifications and changes may be made within the scope of the invention, which is defined by the appended claims.

What is claimed is:

1. An emergency arrest device for a zip line, comprising:
a front plate adapted to receive a zip line;
a rear plate assembly adapted to receive the zip line, the rear plate assembly having first receiving structure adapted to receive and secure one end of a rope,
a first plate installed so as to face the front plate,
a second plate having the first receiving structure, and
a third plate having a shape adapted to receive the second plate, the second plate and the third plate being keyed or shaped such that the second plate is received in the third plate in any of a number of rotational positions, the second plate and the third plate installed behind the first plate;
connecting members connecting the front plate and the rear plate assembly; and
a moveable carriage mounted within the emergency arrest device between the front plate and the rear plate assembly, the movable carriage having second receiving structure adapted to receive and secure the other end of the rope.

2. The emergency arrest device of claim 1, wherein the first receiving structure and the second receiving structure comprise respective pluralities of openings.

3. The emergency arrest device of claim 1, wherein the second plate comprises one or more permanent magnets positioned and adapted to be attracted to the first plate or elements of the first plate.

4. The emergency arrest device of claim 1, wherein the front plate, the first plate, the second plate, and the third plate each have a slot extending from an edge inwardly to receive the zip line.

5. The emergency arrest device of claim 4, further comprising a front bumper cap adapted to cover a front side of the front plate and a rear bumper cap adapted to cover a rear side of the rear plate assembly.

6. The emergency arrest device of claim 5, wherein the front bumper cap and the rear bumper cap each have a slot extending in an opposite direction than the slots of the front plate, the first plate, the second plate, and the third plate.

7. The emergency arrest device of claim 1, the moveable carriage further comprising wheeled bearings adapted to bear against the connecting members.

8. The emergency arrest device of claim 1, wherein the connecting members comprise a bottom connecting member and a pair of side connecting members.

9. The emergency arrest device of claim 7, wherein a bottom connecting member of the connecting members and each of a pair of side connecting members of the connecting members further comprise a guide structure, and the moveable carriage moves along the guide structures.

10. The emergency arrest device of claim 9, wherein each of the guide structures comprises a slot.

11. The emergency arrest device of claim 1, further comprising a resilient member positioned and adapted to bear between the moveable carriage and the front plate.

12. An emergency arrest device for a zip line, comprising:
a front plate adapted to receive a zip line;
a rear plate assembly adapted to receive the zip line, the rear plate assembly having
first receiving structure adapted to receive and secure one end of a rope, the first receiving structure adapted to be positioned in any of a number of different rotational positions,
a first plate installed so as to face the front plate,
a second plate having the first receiving structure, and
a third plate having a shape adapted to receive the second plate, the second plate and the third plate being keyed or shaped such that the second plate is received in the third plate in any of the number of different rotational positions, the second plate and the third plate installed behind the first plate;
connecting members connecting the front plate and the rear plate assembly; and
a moveable carriage mounted within the emergency arrest device between the front plate and the rear plate assembly, the movable carriage having second receiving structure adapted to receive and secure the other end of the rope.

13. The emergency arrest device of claim 12, wherein the first plate, the second plate, and the third plate each include a central opening;
the central opening of the third plate has the shape adapted to receive the second plate;
the central opening of the first plate is smaller than the central opening of the third plate, such that the first plate forms a lip in front of the second plate.

14. The emergency arrest device of claim 13, wherein the first plate is made of a ferromagnetic material and the second plate and the third plate are made of non-ferromagnetic materials.

15. The emergency arrest device of claim 14, wherein the second plate includes one or more permanent magnets positioned and arranged to be attracted to the first plate.

16. The emergency arrest device of claim 12, further comprising a resilient member positioned and adapted to bear between the moveable carriage and the front plate.

17. The emergency arrest device of claim 16, wherein the resilient member is a compression spring, and the position of one end of the compression spring is adjustable such that a level of resilient force provided by the compression spring is adjustable.

* * * * *